United States Patent [19]

Yoshida et al.

[11] Patent Number: 4,954,043
[45] Date of Patent: Sep. 4, 1990

[54] BALANCE MECHANISM OF AN INDUSTRIAL ROBOT

[75] Inventors: Mitsutoshi Yoshida; Toshio Tsubota; Hiroshi Okumura, all of Nagoya, Japan

[73] Assignee: Mitsubishi Jukogyo K.K., Tokyo, Japan

[21] Appl. No.: 477,114

[22] Filed: Feb. 7, 1990

Related U.S. Application Data

[63] Continuation of Ser. No. 7/234,269, Aug. 19, 1988, abandoned.

[30] Foreign Application Priority Data

Nov. 17, 1987 [JP] Japan .................................. 62-288347

[51] Int. Cl.$^5$ ............................................. B66C 23/72
[52] U.S. Cl. ........................................ 414/719; 901/48
[56] References Cited

U.S. PATENT DOCUMENTS

| 4,500,251 | 2/1985 | Kiryu et al. | 901/48 X |
|---|---|---|---|
| 4,728,247 | 3/1988 | Nakashima et al. | 901/48 X |
| 4,753,128 | 6/1988 | Bartlett et al. | 901/48 X |
| 4,784,010 | 11/1988 | Wood et al. | 901/48 X |

FOREIGN PATENT DOCUMENTS

| 169318 | 1/1986 | European Pat. Off. | |
| 2848385 | 6/1979 | Fed. Rep. of Germany | 901/48 |
| 0219427 | 3/1985 | Fed. Rep. of Germany | 901/48 |
| 3601455 | 7/1986 | Fed. Rep. of Germany | 901/48 |
| 59-37077 | 2/1984 | Japan. | |
| 59-112587 | 7/1984 | Japan. | |
| 60-131182 | 7/1985 | Japan. | |
| 61-9298 | 1/1986 | Japan. | |
| 62-57891 | 3/1987 | Japan. | |
| 63-7918 | 2/1988 | Japan. | |
| 715317 | 2/1980 | U.S.S.R. | |
| 1074709 | 2/1984 | U.S.S.R. | 901/48 |

*Primary Examiner*—Robert J. Spar
*Assistant Examiner*—James T. Eller, Jr.
*Attorney, Agent, or Firm*—Stanger, Michaelson, Spivak & Wallace

[57] ABSTRACT

A balance mechanism of an industrial robot is provided with a first balance mechanism for a first arm which is swingably mounted to a stand of the robot and a second balance mechanism for a second arm which is swingably mounted to a distal end of the first arm. The first balance mechanism includes a flexible coupling device such as, for example, a chain, led through a guide, which couples between a coupling element of a coupling member which is mounted to a center of angular movement of a proximal end of the first arm and a spring having one end fixed to the stand and which is moved in the direction of deformation when the first arm is angularly moved. The second balance mechanism includes a counterbalancer disposed in the opposite side to an operation side of the second arm and a center of angular movement of the second arm constitutes a fulcrum. The balance mechanisms can be applied to the robot without exchanging parts greatly even if the robot is installed in any position.

2 Claims, 6 Drawing Sheets

BALANCE MECHANISM OF AN INDUSTRIAL ROBOT

This is a continuation of application Ser. No. 234,269, filed Aug. 19, 1988 now abandoned.

FIELD OF THE INVENTION AND RELATED STATEMENT

The present invention relates to a balance mechanism for use in a industrial robot, an automatization apparatus and the like.

An industrial robot is provided with a balance mechanism to balance a plurality of arms. In particular, a playback type robot used for painting, welding and assembling is required to learn a movement procedure by being moved through a working procedure by an operator. Accordingly, it is necessary to balance the robot for all positions of the arms in order to improve the performance of learning the working procedure.

The balance mechanism having a simple structure uses a spring. The present applicant has proposed a balance mechanism by a spring using a link mechanism (referred to in Japanese Utility Model Provisional Publication No. 61-144993, or No. 144993/1986).

FIG. 6 is a front view of a robot including the above balance mechanism of a spring type, FIG. 7 is a sectional view of the robot taken along line A—A, and FIG. 8 is a side view of the robot looking in the direction of arrow B. A rotatable stand 02 is rotatably mounted on a base 01 of the robot. A vertical arm 04 is swingably mounted on a bracket 03 attached on the rotatable stand 02 and a horizontal arm 05 is swingably mounted to an upper portion of the vertical arm 04. A wrist 06 is mounted on a tip of the horizontal arm 05 and the wrist 06 can be moved in plural directions. The horizontal arm 05 is adapted to be driven by an actuator 07 and the vertical arm 04 is also adapted to be driven by an actuator 08.

FIGS. 7 and 8 show the balance mechanism of the vertical arm 04. The vertical arm 04 is swingably supported to the bracket 03 on the rotatable stand 02 through a shaft 012. One end of a link 014 is rotatably coupled with a lower portion of the vertical arm 04 through a pin 013. A lever 016 is rotatably mounted to the braket 03 through a pin 015. The other end of the link 014 is rotatably coupled with an upper end of the lever 016 through a pin 017. One end of a spring 018 is rotatably attached to an end of the bracket 03 opposite to the side to which the lever 016 is mounted and the other end of the spring 018 is coupled with a lower end of the lever 016 through a pin 020.

The force applied to the vertical amr 04 is transmitted to the link 014 which is swingably coupled with a pin 013 a distance of r from the shaft 012 and further transmitted through the pin 017, the lever 016 and the pin 020 to the spring 018.

When an inclination angle $\theta$ of the vertical arm 04 ($\theta=0$ when the arm stands vertically) is increased, the link 014 is pulled through the pin 013 at the distance of the arm length of r from the center of the arm 04 and the upper end of the lever 016 pulled through the pin 017 by the link 04 so that the lever 016 is inclined about the pin 015. The stroke of the lever 016 is amplified by a lever ratio of $R_3/R_4$ (where $R_3$ is a distance between axial centers of the pins 015 and 017 and $R_4$ is a distance between axial centers of the pins 015 and 020) and the spring 018 is extended. The moment around the pin 015 is varied in response to variations of an angle between the link 014 and a line of the pins 015 and 017 and an angle between the spring 018 and a line of the pin 015 and 020 to obtain the balance force in response to a posture or positional state of the vertical arm 04 at all times.

On the other hand, a balance mechanism of the horizontal arm 05 includes, as shown in FIG. 7, a link mechanism 022 and a spring 021 having an end swingably supported to a pin 019 in the same manner as the spring 018 used in the balance mechanism of the vertical arm 04. The structure of the link mechanism 022 is substantially identical with that of the vertical arm and accordingly description thereof is omitted.

In the conventional balance mechnism as described above, the two parallel springs 018 and 021 are mounted to the bracket 03 and the balance of the vertical and horizontal arms is adapted to be taken by both the springs 018 and 021 thorugh the link mechanisms.

However, the balance mechanism requires modification of many elements used therein such as, for example, the pin 013, link 014, lever 016, pin 015 and spring 018 when the robot is used by hanging or fixing it on a wall or by hanging it from a ceiling in addition to using the robot in the vertical state. The link mechanisms used in the balance mechanisms of both the horizontal and vertical arms require many parts.

OBJECT AND SUMMARY OF THE INVENTION

The present invention has been made in view of the above problems and an object thereof is to provide a balance mechanism for taking the balance of a robot exactly regardless of the installation position of the robot and without modification of elements of the balance mechanism and with the number of elements greatly reduced.

In order to achieve the above object, a balance mechanism of an industrial robot according to the present invention comprises a first balance mechanism for a first arm swingably mounted to a stand of the industrial robot including a coupling member disposed in a rotary center of a proximal end of the first arm and being angularly moved in synchronism with the first arm, a coupling element mounted to an eccentric position to a center of the angular movement of the coupling member to be angularly moved in interlocked relationship with the coupling member, a spring having one end fixed to the stand, a flexible coupling device having one end fixed to the coupling element and the other end fixed to the other end of the spring and a giude for guiding the flexible coupling device to move the spring in a direction in which the spring is deformed when the first arm is angularly moved, and a second balance mechanism for a second arm swingably mounted to a distal end of the first arm including a counterbalancer disposed in the opposite side to an operation side of the second arm to keep the balance with the operation side while a center of angular movement of the second arm constituting a fulcrum.

In operation, when the first arm is angularly moved, the coupling member is angularly moved in synchronism with the angular movement of the first arm. The coupling member is coupled with the coupling element which is coupled with the flexible coupling devcie. The flexible coupling device is moved in the direction in which the spring is deformed through the guide to keep the distance of the first arm.

The operation side oif the second arm are balanced with the counterbalancer to keep the balance of the second arm.

As described above, the balance mechanism of the industrial robot of the present invention takes the balance by operating the spring through the flexible coupling device without using the conventional link mechanism. Accordingly, the number of parts constituting the balance mechanism is greatly reduced and further the balance mechanism can be applied as it is without exchanging the parts largely even if the industrial robot is installed in any position.

DETAILED DESCRIPTION OF A PREFERRED EMBODIMENT

An embodiment of an industrial robot provided with a balance mechanism according to the present invention is now described.

Figure 1:
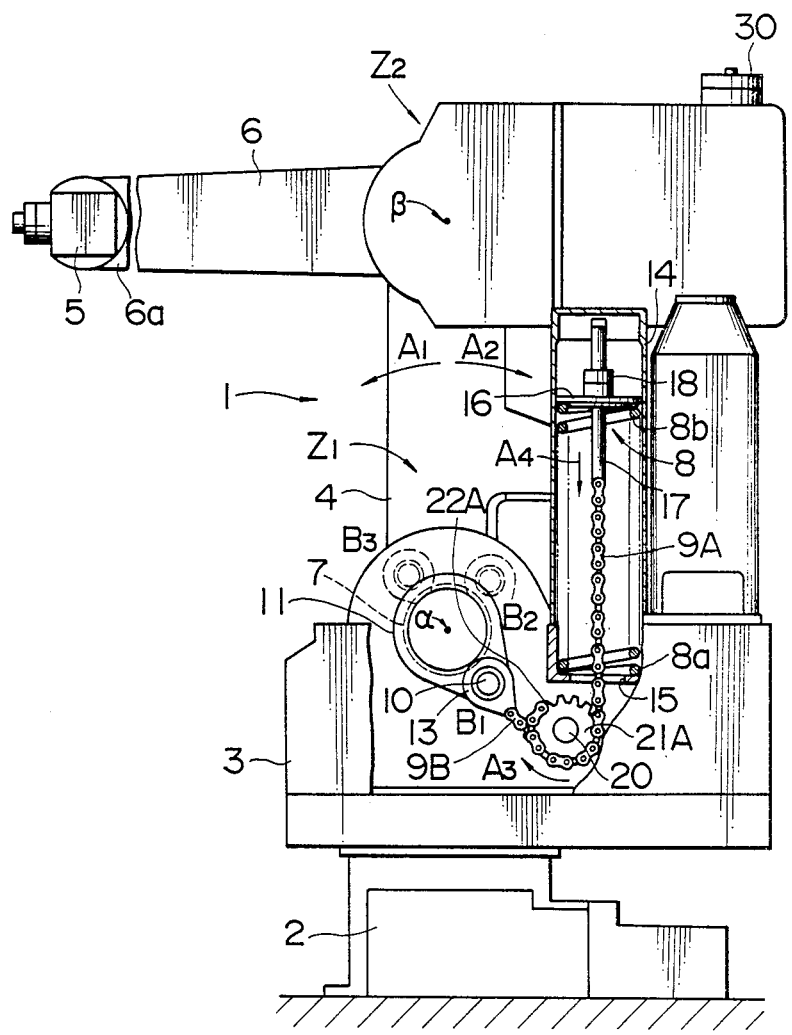
FIG. 1 is a partially broken front view showing a balance mechanism provided in an industrial robot according to an embodiment of the present invention.
Figure 2:
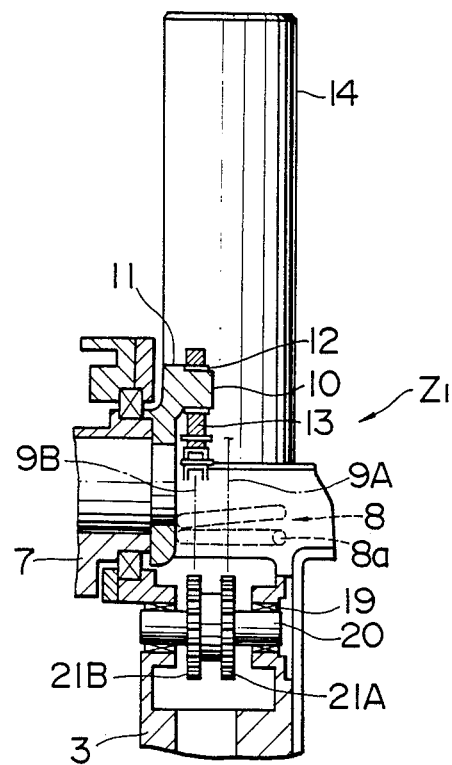
FIG. 2 is a sectional view of a main portion of the balance mechanism of FIG. 1.
Figure 3A:
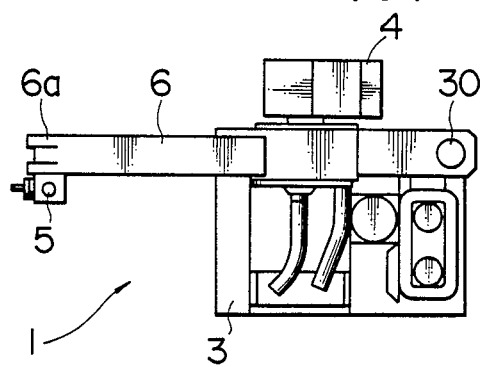
FIGS. 3(a) and (b) are a plan view and a front view of the industrial robot provided with the balance mechanism of FIG. 1.
Figure 3B:
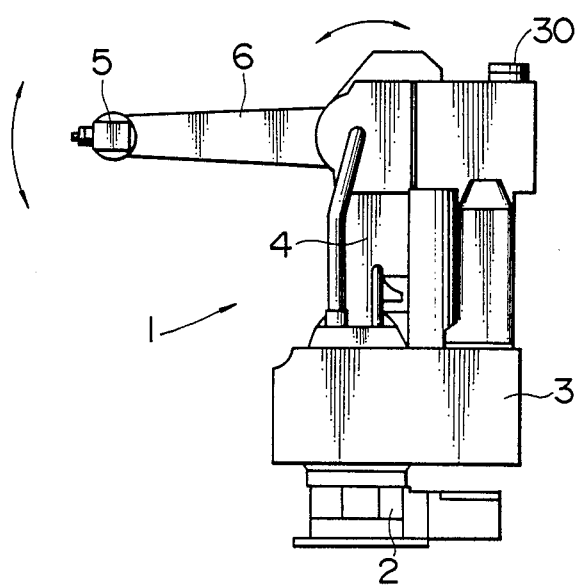

FIG. 1 is a partially broken view of the balance mechanism provided in the industrial robot according to an embodiment of the present invention, FIG. 2 is a sectional view of a main portion of the balance mechanism of FIG. 1 in which a pin support is attached in a position of $B_2$ and FIGS. 3(a) and (b) are a plan view and a front view of the industrial robot provided with the balance mechanism.

The structure of the industrial robot is the same as that of the conventional robot. As shown in FIGS. 3(a) and (b), the industrial robot (hereinafter referred to as "robot") 1 includes a rotatable stand (hereinafter referred to as "stand") 3 which is rotatably disposed on a base 2 through a bearing not shown. A proximal end of a first arm 4 is swingably mounted to the stand 3 and a second arm 6 provided with an operative wrist 5 mounted to one end of the second arm is swingably mounted to a distal end of the first arm 4.

Actuators for driving the stand 3, the first arm 4 and the second arm 6 are not shown.

In the industrial robot 1 as described above, as shown in FIGS. 1 and 2, the first arm 4 of which the proximal end is swingably mounted to the stand 3 and the second arm 6 mounted to the distal end of the first arm 4 are provided with a first balance mechanism $Z_1$ and a second balance mechanism $Z_2$ so that both of the arms keep the balance.

The first balance mechanism $Z_1$ provided in the first arm 4 is described in detail.

The first balance mechanism $Z_1$ provided in the first arm 4 comprises a coupling member including a coupling body 7 which is integrally mounted to a center $\alpha$ of angular movement of the proximal end of the first arm 4 mounted swingably to the stand 3, and a pin support 11, a compression spring (hereinafter referred to as "spring") 8 having one end fixed to the stand 3, a chain 9 constituting a flexible coupling device which transmits the angular movement of the arm 4 to the spring 8 through the coupling member continuously, and a guide constituted by sprockets 21A and 21B.

More particularly, as shown in FIGS. 1 and 2, the coupling body 7 is integrally disposed to the center $\alpha$ of the angular movement of the proximal end of the first arm 4 to be angularly moved in synchronism with the first arm 4. The pin support 11 including a pin 10 mounted vertically thereto is fixed to the coupling body 7 by means of a bolt not shown eccentrically to the center $\alpha$ of the angular movement of the first arm so that the mounting position of the pin support 11 can be change. The coupling body 7 and the pin support 11 consittute the coupling member. A coupling element 13 is rotatably coupled with the pin 10 of the pin support 11 through a bearing 12. Further, the spring 8 including one end $8a$ fixed to the stand is contained in a cover 14 which includes an opening 15 formed at a lower end thereof near the stand. A chain support 16 is mounted to the other end $8b$ of the spring 8 which is not fixed to the stand 3. A chain support shaft 17 is mounted to the chain support 16 so that the vertical mounting position of the chain support 16 can be changed. The sprockets 21A and 21B are disposed side by side to a support shaft 20 disposed rotatably through a bearing 19 to the stand 3 to constitute the guide so that the sprockets are angularly moved in synchronism with each other. The other end of the chain 9A having one end mounted to the chain support shaft 17 is fixed to one dent 22A of the sprocket 21A. Further, the other end of the chain 9B having one end mounted to the coupling element 13 is fixed to one dent not shown of the sprocket 21B. The respective other end portions of both the chains 9A and 9B are wound on lower sides of the sprockets 21A and 21B, respectively, in the opposite direction to each other. A portion of the chain 9A from the start point of the engagement between the chain 9A and the sprocket 21A to the mounting position of the chain 9A to the chain support shaft 17 passes through the opening 15 of the cover 14 and extends straight. More particularly, the deformation direction of the spring 8 is identical with the moving direction of the chain toward the sprocket 21A. A distance of the chain 9B between the start point of the engagement between the chain 9B and the sprocket 21B and the coupling point between the chain 9B and the coupling element 13 is minimized when the first arm 4 stands vertically. Accordingly, when the first arm 4 is angularly moved in the direction of arrow $A_1$ or $A_2$, the sprocket 21B angularly moved clokwise (in the direction of arrow $A_3$ in FIG. 1) and the chain 9A is wound on the sprocket 21A which is angularly moved in the same direction as that of the sprocket 21B in synchronism with the sprocket 21B. Consequently, the chain support shaft 17 is moved down (in the direction of arrow $A_4$ in FIG. 1) so that the spring is compressed to keep the balance.

More particularly, while the moment of a load of the first arm 4 about the center $\alpha$ of the angular movement changes depending on the position of the first arm 4, the first balance mechanism $Z_1$ is operated as follows.

When the position of the first arm 4 changes in the direction of arrow $A_1$ or $A_2$ of FIG. 1, the spring 8 of the first balance mechanism $Z_1$ is compressed as described above and the resilient force of the spring is increased. Thus, the resilient force of the spring and the moment of the center $a$ of the angular movement of the first arm 4 are balanced each other.

Further, when the load of the first arm 4 is varied greatly, the position of the pin 10, the position of the chain support shaft 17 with respect to the chain support 16, the diameter of the sprockets 21A and 21B concerning the chains 9A and 9B and the resilient force and the spring constant of the spring 8 may be varied to cope with the variation of the load.

The second balance mechanism $Z_2$ provided in the second arm 6 is described in detail. As shown in FIG. 1, the operative wrist 5 is mounted to one end 6a of the second arm 6 mounted to the distal end of the first arm 4. On the other hand, a counterbalancer 30 is provided to the other end of the second arm 6 opposite to the end 6a while the center $a$ of the angular movement of the second arm 6 constitutes a fulcrum.

As described above, since the second arm 6 is provided with the counterbalancer 30, the second arm 6 is adapted to balance with the counterbalancer 30 in the center $\beta$ of the angular movement of the second arm 6 even if the second arm 6 is changed to any position. The load applied to the second arm 6 concentrates on the center $\beta$ of the angular movement thereof and accordingly the load applied to the first arm 4 does not change even if the second arm 6 is moved to any position.

Further, even if the weight of the wrist 5 attached to the proximal end 6a of the second arm 6 is changed depending on work, the weight of the counterbalancer 30 can be varied and the balance of the second arm with respect to the center $\beta$ of the angular movement thereof can be kept easily.

Figure 4:
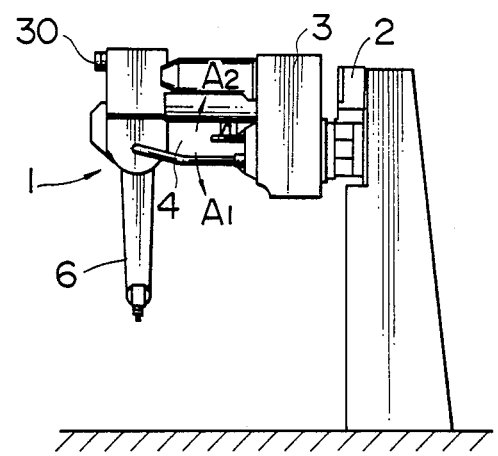
FIG. 4 is a front view of the industrial robot mounted to a wall.
Figure 5:
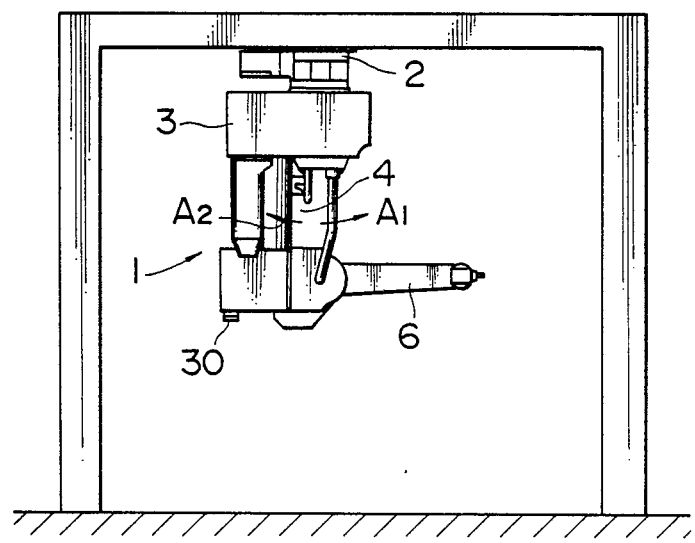
FIG. 5 is a front view of the industrial robot hung from a ceiling.
Figure 6:
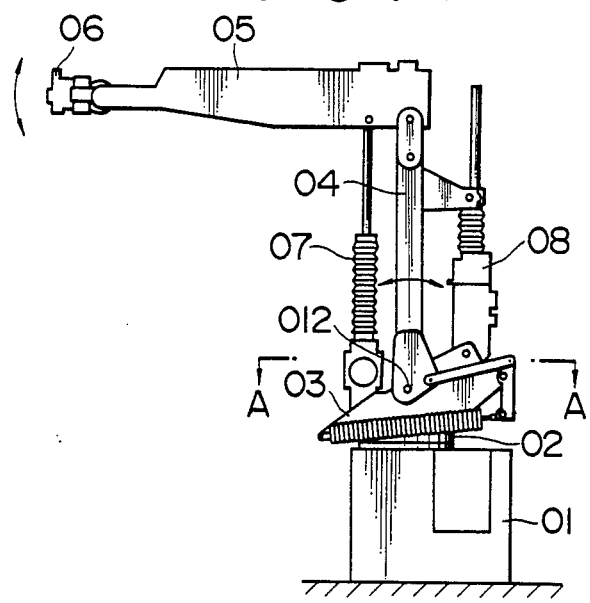
FIG. 6 is a front view of a robot provided with a conventional balance mechanism.
Figure 7:
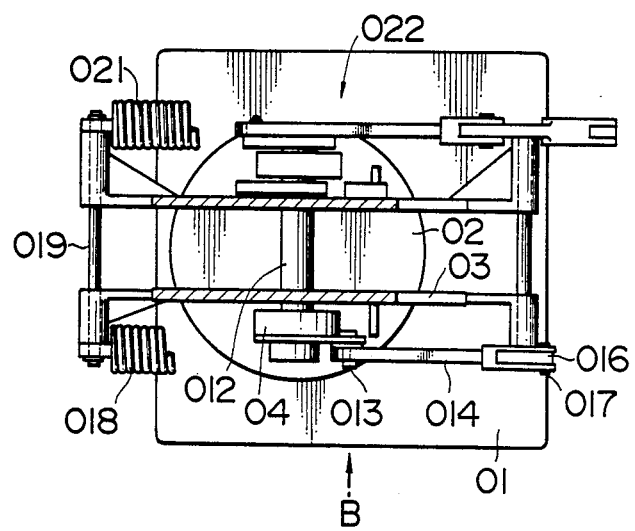
FIG. 7 is a sectional view of the robot taken along line A—A of FIG. 6.
Figure 8:
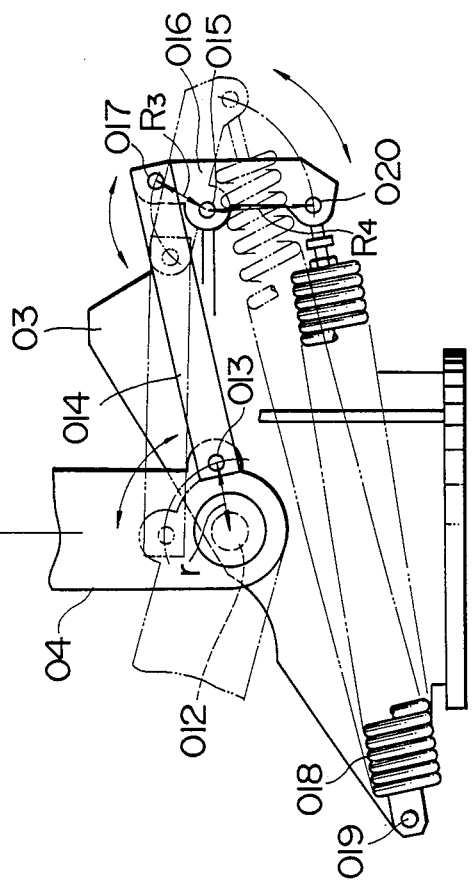
FIG. 8 is a side view of a portion of the robot of looking in the direction of arrow B of FIG. 7.

The foregoing description has been made to the robot 1 which is installed on a floor vertically, while when the robot 1 is hung on a wall or from a ceiling to perform work as shown in FIGS. 4 and 5, the following adjustment may be made. It can be made easily since the sprockets 21A and 21B are disposed side by side and the chain support shaft 17 of which the vertical mounting position can be changed is employed.

More particulaly, when the industrial robot 1 is hung on a wall as shown in FIG. 4, it is merely required that the mounting position of the pin support 11 to the coupling body 17 of the balance mechanism $Z_1$ for the first arm 4 changes from the position $B_1$ to $B_2$ shown in FIG. 1 while the spring 8 is compressed. In other words, when the pin support 11 is attached to the position $B_2$ and the first arm 4 is horizontal as shown in FIG. 4, the spring 8 is always compressed to take the balance in order to support the load of the first arm 4 and the second arm 6. Further, when the first arm 4 is moved down in the direction of arrow $A_1$ of FIG. 4, the spring 8 is further compressed to support the load. On the other hand, when the first arm 4 is moved up in the direction of $A_2$, the spring 8 is adapted to be reversely returned to take the balance.

Further, when the robot 1 is hung from a ceiling as shown in FIG. 5, it is merely required that the mounting position of the pin support 11 to the coupling body 7 changes from the position $B_1$ to $B_3$ shown in FIG. 1 while the spring 8 is compressed. In other words, when the pin support 11 is mounted to the position $B_3$, the spring 8 is almost compressed and even if the first arm is moved in either direction $A_1$ or $A_2$, the restoring force of the spring is applied to the arm.

In the embodiment, the chains 9A and 9B are used as the flexible coupling device, while the flexible coupling device may be a timing belt and a wire if it can change the moment continuously.

Further, the compression spring is suitable for the spring 8 in the balance mechanism of the present invention, while it is not necessarily limited to the compression spring. The coupling element 13 may be directly coupled with the chain support shaft 17 through one chain and the chain guide may constitute one sprocket.

We claim:

1. A balance apparatus for an industrial robot having a first arm swingably disposed at a center of rotation on a stand and a second arm swingably disposed at a distal end of the first arm about a center of rotation, said apparatus comprising:
   I. a first balance mechanism including:
      a. a coupling body disposed in the center of rotation of a proximal end of the first arm and adapted to move angularly in synchronism with said first arm;
      b. a pin support removably fixed to said coupling body at a number of changeable positions, a pin projecting from said support at a position spaced from the center of rotation of said coupling body;
      c. a coupling element rotatably disposed at said pin of said pin support;
      d. a spring having one end fixed to the stand;
      e. a flexible coupling device having one end fixed to said coupling element and another end fixed to the other end of said spring; and
      f. a guide for guiding said flexible coupling device to move said spring in a direction in which said spring is deformed when said first arm is moved angularly such that said flexible coupling device can move a distance corresponding to the rotation of said first arm; and
   II. the second arm having one operative wrist at one side of the center of rotation of the second arm, a second balance mechanism, including:
      a. a weight adjusting counter balancer opposite to the operative wrist with respect to the center of rotation of said second arm to balance the weight of said operative wrist about the center of its rotation relative to said first arm,
   III. the position of said removably fixed pin support on said coupling body being changeable to any one of a number of positions to vary the compression of said spring to correspond to the load of the first and second arms due to the posture of the installation of the robot.

2. An industrial robot, comprising:
   I. a base;
   II. a first arm swingably disposed about a center of rotation on said base;
   III. a second arm swingably disposed at a distal end of said first arm about a center of rotation, said second arm having one operative wrist at one side of the center of rotation of said second arm;
   IV. a first balance mechanism for said first arm, and a second balance mechanism for said second arm;
   V. said first balance mechanism including:
      a. a coupling body disposed in the center of rotation of a proximal end of said first arm and adapted to move angularly in synchronism with said first arm;

b. support means on said coupling body offset from the center of rotation of said coupling body;

c. a spring secured to said stand;

d. a flexible coupling device coupling another end of said spring to said support means;

e. a guide for guiding said flexible coupling device to move said spring in a direction in which said spring in deformed when said first arm is moved angularly such that said flexible coupling device can be moved a distance corresponding to the rotation of said first arm;

VI. said second balance mechanism including:

a. a weight adjusting counter balancer opposite to the operative wrist with respect to the center of rotation of said second arm to balance the weight of said operative wrist around the center of its rotation relative to said first arm;

VII. said support means including a support arrangement removably fixed to the coupling body at any one of a plurality of different positions offset from the center of rotation of the coupling body for holding said coupling device at one of the positions so as to vary the compression of the spring on the basis of the attitude of the installation.

* * * * *